United States Patent
Schmidt et al.

(10) Patent No.: US 10,857,868 B2
(45) Date of Patent: Dec. 8, 2020

(54) STRUCTURAL COMPONENT FOR A MOTOR VEHICLE HAVING A REINFORCING ELEMENT

(71) Applicant: Linde + Wiemann SE & Co. KG, Dillenburg (DE)

(72) Inventors: Werner Schmidt, Alzenau (DE); Marcel Georg, Dillenburg (DE)

(73) Assignee: Linde + Wiemann SE & Co. KG, Dillenburg (DE)

( * ) Notice: Subject to any disclaimer, the term of this patent is extended or adjusted under 35 U.S.C. 154(b) by 85 days.

(21) Appl. No.: 16/303,223

(22) PCT Filed: May 2, 2017

(86) PCT No.: PCT/EP2017/060357
§ 371 (c)(1),
(2) Date: Nov. 20, 2018

(87) PCT Pub. No.: WO2017/211502
PCT Pub. Date: Dec. 14, 2017

(65) Prior Publication Data
US 2019/0210442 A1 Jul. 11, 2019

(30) Foreign Application Priority Data
Jun. 8, 2016 (DE) .................. 10 2016 110 578

(51) Int. Cl.
*B60K 1/04* (2019.01)
*B62D 21/15* (2006.01)
*B62D 29/00* (2006.01)

(52) U.S. Cl.
CPC ............ *B60K 1/04* (2013.01); *B62D 21/15* (2013.01); *B60Y 2306/01* (2013.01); *B62D 29/005* (2013.01); *B62D 29/007* (2013.01)

(58) Field of Classification Search
CPC .... B62D 21/15; B62D 29/005; B62D 29/007; B60K 1/04; B60Y 2306/01
(Continued)

(56) References Cited

U.S. PATENT DOCUMENTS 8,029,050 B2 * 10/2011 Tamakoshi ........... B62D 21/152
296/193.06
9,821,853 B2 * 11/2017 Torikawa ............. B62D 25/025
(Continued)

FOREIGN PATENT DOCUMENTS

DE 102005038463 A1 2/2007
DE 102013103719 A1 6/2014
(Continued)

OTHER PUBLICATIONS

International Search Report for PCT/EP2017/060357 dated Jul. 28, 2017.

*Primary Examiner* — Joseph D. Pape
*Assistant Examiner* — Dana D Ivey
(74) *Attorney, Agent, or Firm* — Rogowski Law LLC

(57) ABSTRACT

The invention relates to a structural component for a motor vehicle, comprising an at least partially hollow profiled segment, which can be connected to a motor vehicle body by means of at least two fastening elements arranged in a fastening section. The problem addressed by the invention is that of increasing the crash safety of the structural component. This problem is solved in that a reinforcing element (6) is arranged in the fastening section between a lateral impact surface (16) and the fastening elements (4), which reinforcing element extends in the longitudinal direction of the profiled segment and, in the event of an impact from the impact surface, laterally comes into contact with the fastening means at least partially by means of displacement of the fastening elements, the impact energy thus being absorbed.

16 Claims, 6 Drawing Sheets

(58) Field of Classification Search
USPC .................................................. 296/187.03
See application file for complete search history.

(56) References Cited

U.S. PATENT DOCUMENTS

| | | |
|---|---|---|
| 2010/0026051 A1 | 2/2010 | Tamakoshi |
| 2013/0270863 A1 | 10/2013 | Young |
| 2013/0270864 A1 | 10/2013 | Young |
| 2016/0107699 A1 | 4/2016 | Panganiban |

FOREIGN PATENT DOCUMENTS

| | | |
|---|---|---|
| DE | 102015116836 A1 | 4/2016 |
| EP | 2076421 B1 | 5/2012 |

* cited by examiner

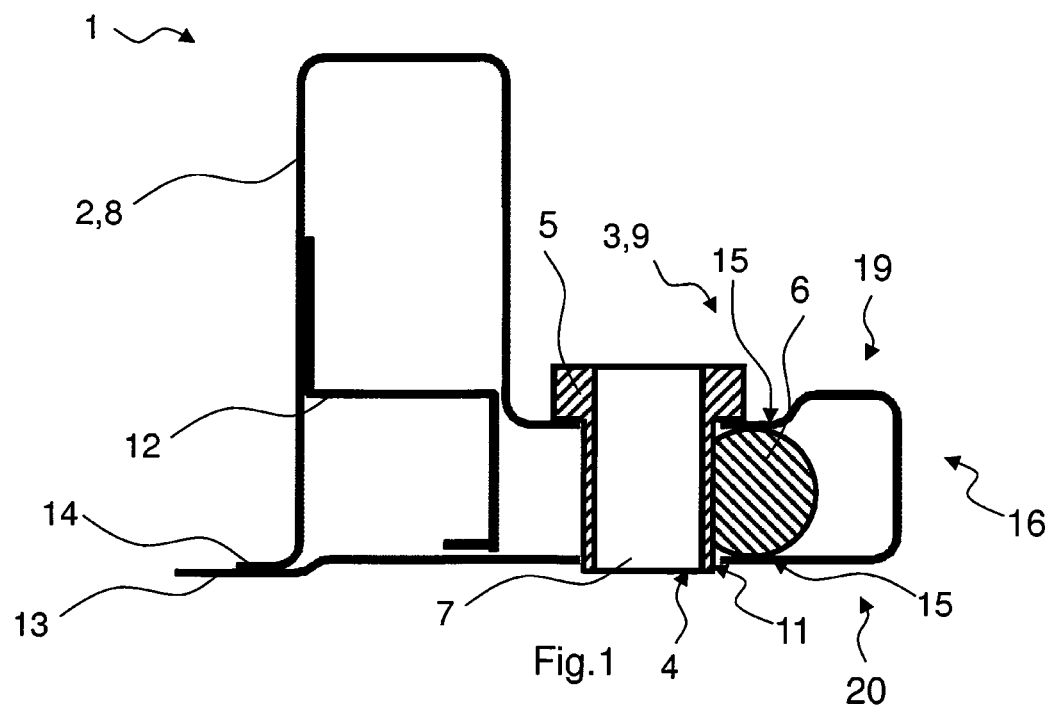
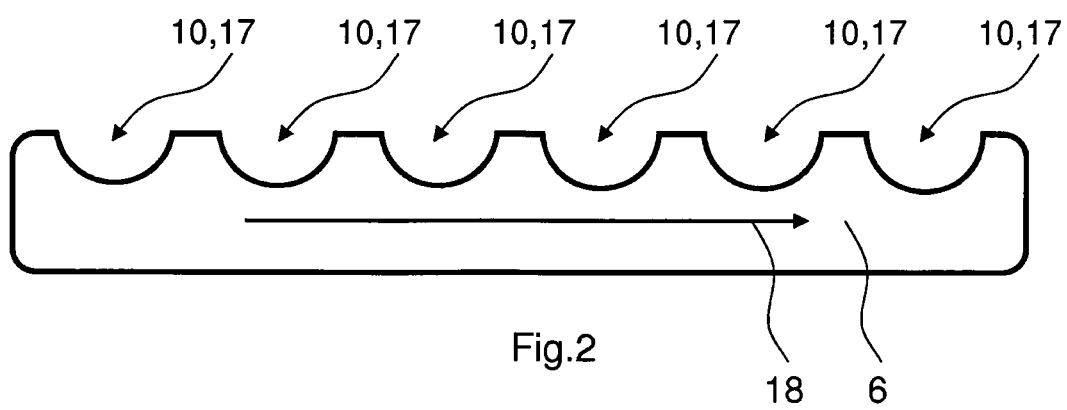

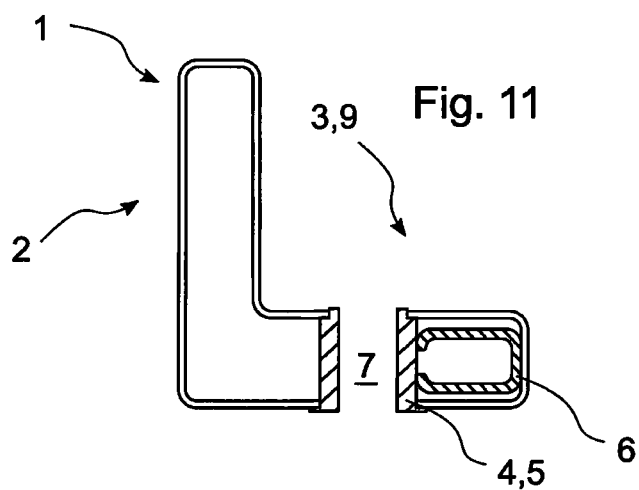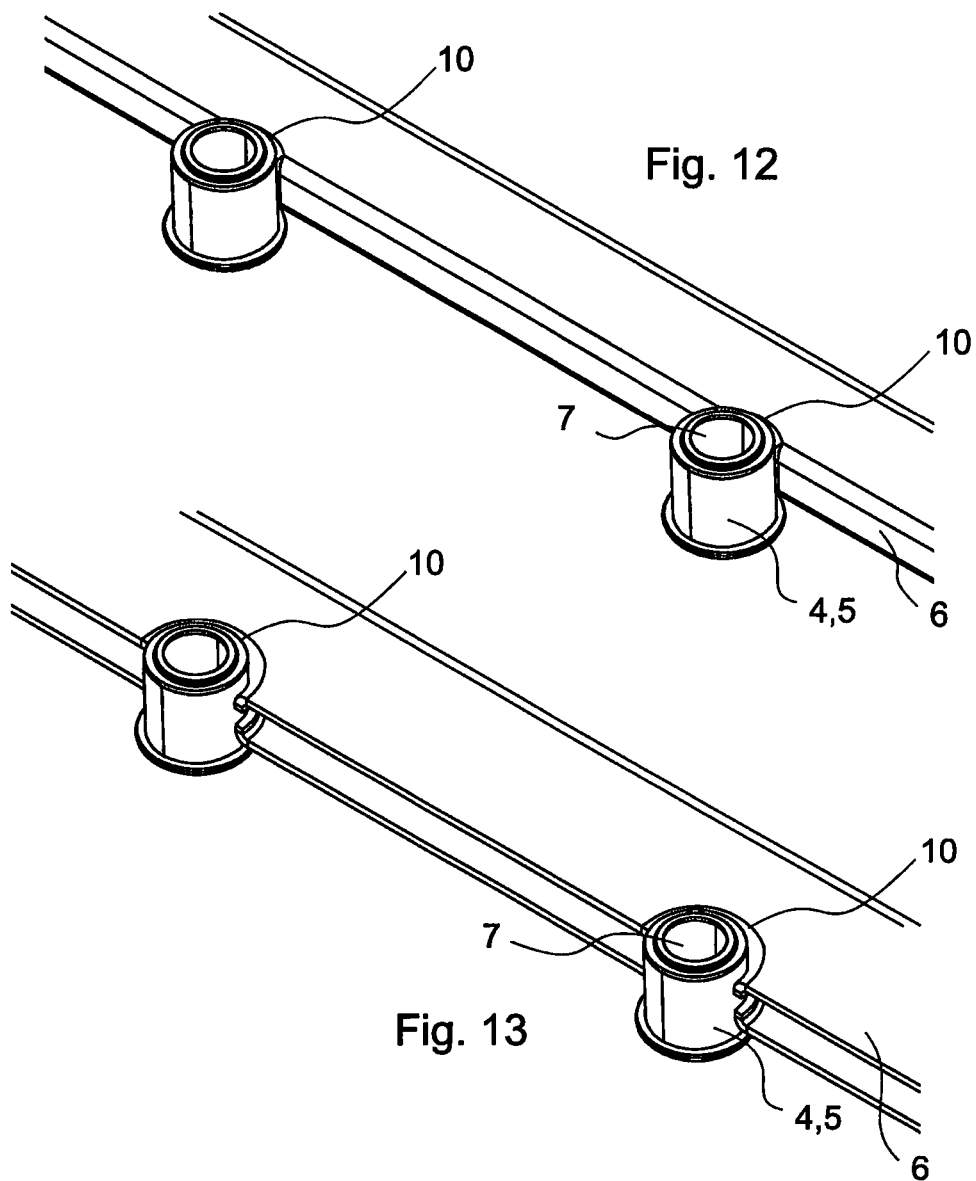

STRUCTURAL COMPONENT FOR A MOTOR VEHICLE HAVING A REINFORCING ELEMENT

CROSS-REFERENCE TO RELATED APPLICATIONS

This application is a national stage application (under 35 USC § 371) of PCT/EP2017/060357, filed May 2, 2017, which claims benefit of German application No. 10 2016 110 578.3, filed Jun. 8, 2016, the contents of each of which are incorporated by reference herein.

BACKGROUND OF THE INVENTION

Technical Field and State of the Art

The invention relates to a structural component for a motor vehicle as well as to a structural frame and to a battery box for a motor vehicle.

A modular configuration of the individual vehicle components is being increasingly employed in modern motor vehicles.

In this context, structural components are installed on the motor vehicle, which are made of an at least partially hollow profile segment and which can be attached to the car body with several fastening means. These structural components constitute, among other things, the part of the crash structures which, in case of an accident, ensure the stability of the motor vehicle and which are intended to keep the effects of an impact away from the car components housed in the motor vehicle.

In case of an impact, such structural components are deformed in order to absorb the kinetic energy that acts upon the motor vehicle during the impact by transforming this energy into deformation work.

When hollow profiles are used for such structural components, it can happen that the profile collapses when a given load is exceeded and, if further deformation occurs, only a small amount of deformation work can be performed. Moreover, fastening means that pass through the profile can weaken the structure of the structural component, which is why structural components with reinforcing elements fundamentally have to be designed to be more solid a greater mass. This, however, runs counter to the requirements for lightweight construction in modern motor vehicles.

German patent application DE 10 2005 038 463 A1 discloses a body sill made with a shell construction, whereby an internal reinforcement profile is provided. This reinforcement profile has two shells, whereby the two shells are joined together by latching connections in the form of screw bolts with which the movement of the reinforcement shells relative to each other in case of a crash can be set and limited.

German patent application DE 10 2013 103 719 A1 discloses a bumper bracket that is fastened to the side of a support structure, whereby, in case of a crash, the fastening sites, especially riveted connections, bend, thus allowing movement relative to the support structure.

Before this backdrop, the invention has an objective of putting forward an improved structural component which, in spite of a possible weakening due to the fastening means, exhibits a high degree of stability and absorption capacity vis-à-vis deformation energy.

SUMMARY OF THE INVENTION

Accordingly, a structural component for a motor vehicle is being put forward, having an at least partially hollow profile segment. The profile segment can be joined to the car body by means of at least two fastening means arranged in a fastening section of the profile segment. In the fastening section of the profile segment between a side impact surface and the fastening means, there is a reinforcement element that extends in the lengthwise direction of the profile segment and that, in the case of an impact coming from the impact surface, comes to rest against the side of the fastening means, thereby absorbing the impact energy, at least partially via a movement of the fastening means.

The reinforcement element allows a systematic reinforcement of the structural component which causes a locally occurring effect of an accident—also referred to as an intrusion—to be distributed by the reinforcement element over a greater length of the structural component. In this process, the reinforcement element comes to rest against several fastening means, and it transmits the force introduced by the impact to these fastening means, so that the fastening means are moved inside the profile segment, thereby generating additional deformation energy.

Moreover, it can be provided for the reinforcement element to be resting against at least one fastening means when the former is in its installed state. In this manner, on the one hand, it can be achieved that the reinforcement element in its installed state is already secured in one direction, in other words, in the direction of the fastening means, in order to the prevent movements during regular operation. On the other hand, this configuration ensures that, in case of an impact, the impact energy that acts upon the reinforcement element is transmitted directly to the fastening means against which the reinforcement element is already resting when it is in its installed state.

Moreover, it can be advantageously provided for the reinforcement element in its installed state to be positively and/or non-positively secured in a clamping area of the profile segment. This has the advantage that any vibrations and any resulting noises that might occur during regular operation can be successfully reduced or prevented.

As an alternative, the reinforcement element in its installed state can be welded to the profile segment. A combination of clamping and welding is likewise possible.

Advantageously, it can also be provided for the reinforcement element to have positive-fit means that interact with the fastening means so that, in case of an impact and if the positive-fit means engage into the fastening means, the force component can be transmitted to the fastening means in the lengthwise direction of the profile segment. This has the special advantage that the forces transmitted by the reinforcement element are not transmitted to the fastening means only in the direction of the actual impact. Moreover, when the reinforcement element is deformed, force components are transmitted to the fastening means in the lengthwise direction of the profile segment and consequently, the fastening means can also be moved in the crosswise direction. This brings about the absorption of additional deformation energy since the fastening means are moved towards each other inside the profile segment if, at the same time, the reinforcement element is shortened under the effect of bending and the positive-fit means move crosswise to the direction of impact.

In a special embodiment of the invention, it can be provided for the fastening means to be configured as sleeves which extend between the top and the bottom of the fastening section and which are held in the profile segment essentially with a positive fit against lateral movement. Such reinforcement sleeves create a simple screwed connection between the structural component and the car body. Fastening screws can simply be inserted through the sleeve and then screwed to the car body. In order to prevent a direct effect of the screw force onto the profile segment and its cross-sectional shape, the sleeves are supported on the bolt on the one hand and on the car body on the other hand. The sleeves are held in the profile segment with a positive fit against lateral movement so that, on the one hand, the structural component is securely held and, on the other hand, in case of an impact, the deformation work can be applied directly through a movement of the sleeve inside the profile segment.

In a special embodiment of the invention, it can be also be provided for the positive-fit means to have recesses, particularly in the form of circular segments, or else indentations in the reinforcement element that match the circumferential surfaces of the sleeves. It has been found that such a configuration is particularly easy to produce and install.

It can also be provided for the reinforcement element to be configured as a hollow profile. Here, different profile shapes can be put forward. For example, the reinforcement element can be a closed frame profile which can be shaped, for instance, by means of hydroforming. As an alternative, the reinforcement element can be configured as a C-profile, especially as a C-profile with a passage. Such profiles are easy to manufacture. Moreover, when hydroforming processes are used, a suitable heat treatment allows the material properties at certain places of the reinforcement element to be set in targeted manner. By way of example, reference is hereby made, for instance, to a production method according to international patent application WO 98/54370 A1 which, in principle, is suitable for the manufacture of the reinforcement element. However, the reinforcement element can also be made out of a cold-rolled profile that already exhibits the requisite strength without a heat treatment.

In another embodiment of the invention, it can be provided for the recesses of the positive-fit means to be formed by indentations in the hollow profile. After the production of the hollow profile, such indentations can be easily made in it and they account for cost-effective and fast manufacturing.

According to a special embodiment of the invention, it can be provided for the reinforcement element to be formed by a cold-rolled profile, whereby here, particularly a high-strength steel can be used as the material.

If a hydroformed profile is used for the reinforcement element, it can be provided for the reinforcement element to be quenched and thus hardened. In such a case, the reinforcement element is made of a hardenable steel and can especially be made according to the above-mentioned production method known from international patent application WO 98/54370 A1.

The underlying objective is also achieved by a structural frame having at least two structural components joined at their ends as described in the preceding description, whereby the reinforcement elements of the structural components are joined to each other at their ends in order to transmit forces from one reinforcement element to the other reinforcement element. In this manner, the overall stability of a structural frame made of the structural components described above can be enhanced even further since the deformation energy absorbed by a reinforcement element can be partially transmitted to a second reinforcement element, so that the effective deformation can be distributed over a larger part of the structural frame.

In this context, it can also be provided for the reinforcement elements to have embossed pipe ends and for the reinforcement elements to be joined to each other at the pipe ends. Preferably, the pipe ends are joined in such a manner that any movement of the pipe ends relative to each other is practically prevented.

In a refinement thereof, it can also be provided for the reinforcement elements to be connected to each other in such a way that rotation of the pipe ends relative to each other is likewise prevented. In this manner, more deformation work can be transmitted from the first reinforcement element to the second reinforcement element.

It can also be provided for the pipe ends to be integrally bonded to each other or else to be joined by at least one connection means. A welded joint constitutes such a suitable integral bond, whereby various welding methods can be employed here. Suitable connection means include a so-called pin, which is inserted through a hole drilled in both pipe ends and which is preferably held there with a positive and/or non-positive fit.

The underlying objective is also achieved by a battery box for a motor vehicle, having a structural frame according to the preceding description.

Especially in modern electric or hybrid vehicles, the use of such a structural component according to the invention for purposes of creating a structural frame as part of a battery box is particularly advantageous since the battery cells installed in the vehicle have to be protected very well against the effect of intrusions. The structural frame according to the invention fitted with the structural components according to the invention is particularly well-suited for this purpose.

Additional objectives, advantages, features and application possibilities of the present invention ensue from the description below of an embodiment making reference to the drawing. In this context, all of the described and/or depicted features, either on their own or in any meaningful combination, constitute the subject matter of the present invention, also irrespective of their compilation in the claims or the claims to which they refer back.

DESCRIPTION OF THE DRAWINGS

The following is shown, at times schematically:

FIG. 1 a schematic sectional view of the structural component according to the invention;

FIG. 2 a schematic top view of a reinforcement element according to the invention;

FIG. 11 a schematic side view of a fifth embodiment of the invention;

FIG. 12 a detailed view according to the first embodiment of the invention;

FIG. 13 a schematic detailed view according to a modified the first embodiment;

Figure 3:
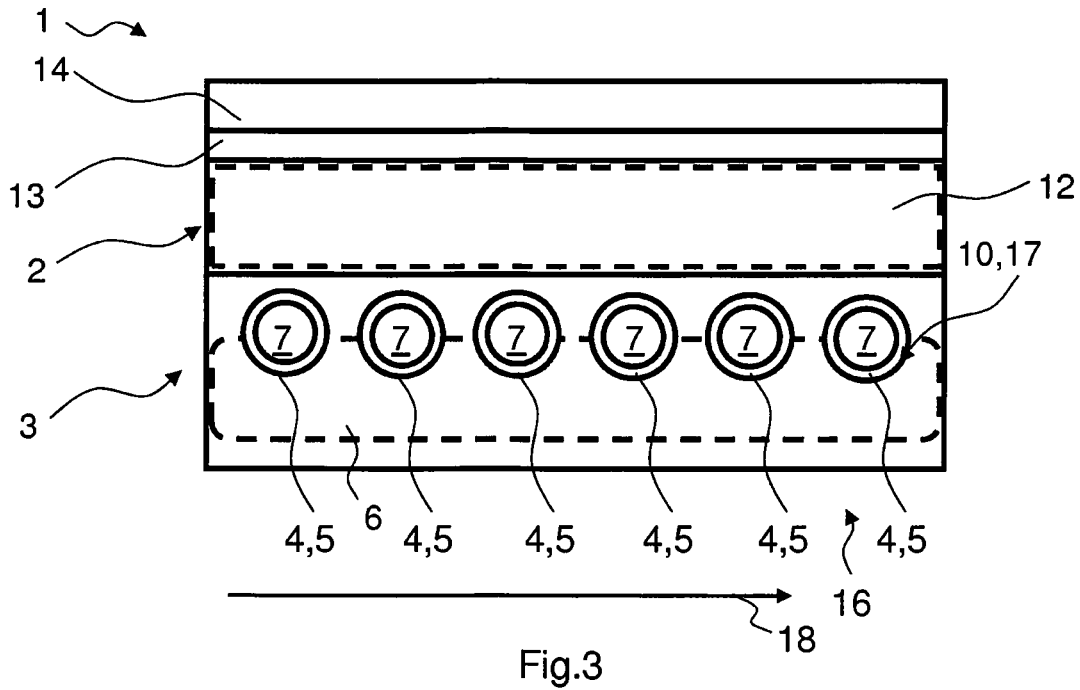
FIG. 3 a schematic top view of a structural component according to the invention.

For the sake of clarity, identical components or those having the same effect are provided with reference numerals in the figures of the drawings shown below, making reference to several embodiments.

DETAILED DESCRIPTION

FIG. 1 shows a structural component 1 according to the invention, which has a profile segment 2 that is configured as a hollow profile, here with an L-shape. It goes without saying that other profile shapes also fall within the scope of the invention.

Figure 4:
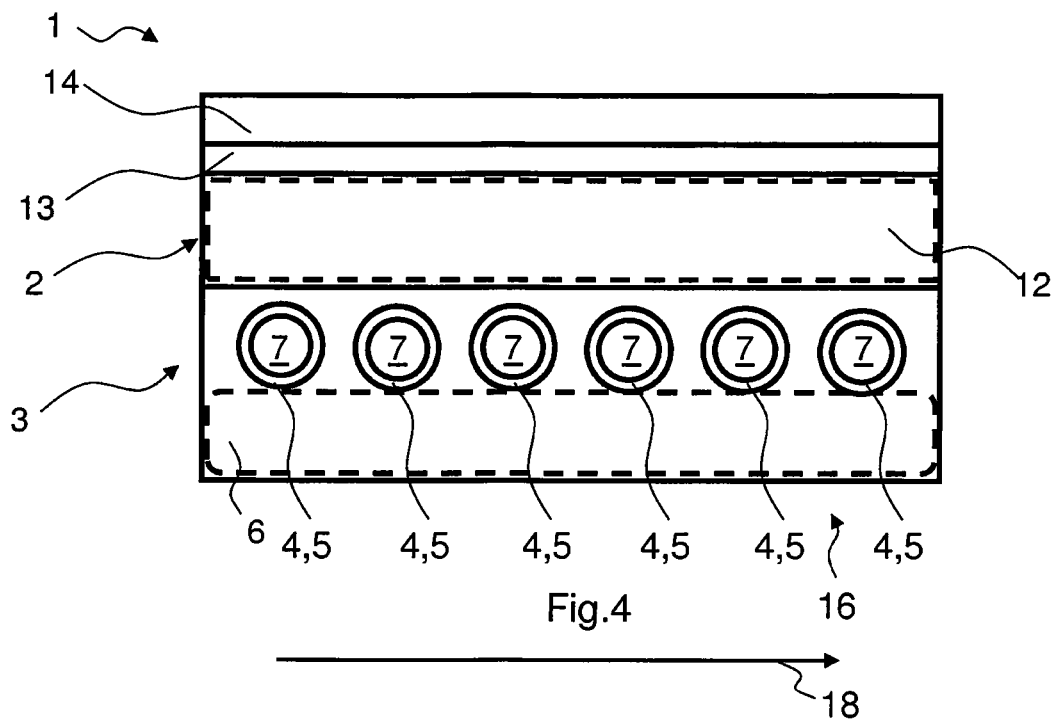
FIG. 4 a schematic top view of a structural component according to the invention, as shown in a second embodiment.

The profile segment 2 has a fastening section 3 in which at least two fastening means 4 in the form of sleeves 5 have been inserted, as shown in FIGS. 3 and 4. The sleeves serve to accommodate bolts to screw the structural component 1 to a car body. The sleeves 5 have holes to accommodate the screw bolts.

At the end of a horizontal leg 9 of the profile segment 2, there is an impact surface 16 via which an impact caused by a crash acts upon the structural component 1. A reinforcement element 6 is arranged between the impact surface 16 and the fastening means 4.

The reinforcement element 6 is configured as an elongated profile component that extends in the lengthwise direction 18. As shown in FIG. 1, it can be configured as a circular profile although it can also be configured as a box profile (see FIG. 5 and FIG. 9), as a C-profile (see FIG. 10) or as a C-profile with a passage. Other profile shapes are likewise conceivable.

According to the first embodiment, the reinforcement element has several positive-fit means 10 in the form of recesses 17 or indentations which match circumferential surfaces 11 of the fastening means 4. In the installed state, as shown, for example, in FIG. 1, the positive-fit means 10 are already resting against the circumferential surfaces 11 of the fastening means 4. In this context, it can be provided for the reinforcement element 6 to already be secured to the circumferential surfaces 11 by means of the positive fit created by the positive-fit means 10. As an alternative, it can be provided for the reinforcement element 6 to be held inside the horizontal leg 9 of the L-profile by means of a clamping connection in the clamping area 15. In a variant according to FIG. 5, it is also possible for the reinforcement element 6 to be secured to the profile segment 2 by means of a weld seam 26. Combinations of these fastening variants are likewise conceivable.

In case of an impact coming from the impact surface 16 in the direction of a vertical leg 8 of the profile segment 2, the reinforcement element 6 comes to rest against the circumferential surfaces 11 of the fastening means 4 and it transmits the force acting upon the reinforcement element 6 practically over the entire length towards the lengthwise direction 18 to the fastening means that are arranged so as to be distributed in the profile segment 2. This arrangement of the fastening means is shown in FIGS. 3 and 4. Owing to the distribution of the force, on the one hand, the reinforcement element 6 is supported on a plurality of points along the lengthwise direction 18 of the structural component 1. On the other hand, a deformation of the structural component 1 also occurs in a larger area of the profile segment along the lengthwise direction 18 since, when the reinforcement element 6 moves, several fastening means 4 inside the profile segment 2 are moved, thus performing deformation work.

As can also be gleaned from FIG. 1, an additional profile 12 can be arranged inside the vertical leg 8 and this additional profile 12 further reinforces the structural design of the structural component 1. Various profile shapes are likewise possible for the additional profile 12, depending on the application case.

In the present embodiment, the profile segment 2 consists of a roll-formed sheet metal part that is bent over several times and subsequently joined to a lower tab 13 and to an upper tab 14 and then closed.

When the structural component 1 forms part of a structural frame 21, these tabs serve as contact surfaces for vehicle components that are to be arranged inside the structural frame 21.

In order to relieve a continuous stress on the profile shape caused by the fastening force exerted by the connection screws, the fastening means 4 are configured as sleeves 5 that extend between the top 19 and the bottom 20 of the horizontal leg 9. In this manner, a press force which is exerted by a bolt that has been inserted through the hole 7 in order to secure the structural component 1 is completely absorbed by the sleeve 5, without affecting the cross-sectional shape of the profile segment 2 in this process and without pushing the top 19 towards the bottom 20.

FIG. 3 shows the first embodiment according to which the reinforcement element 6 is configured as depicted in FIG. 2, so that it has positive-fit means to at least partially accommodate the circumferential surfaces 11 of the sleeves 5.

FIG. 4 shows an alternative embodiment in which the reinforcement element 6 does not have any positive-fit means 10, so that the reinforcement element 6 only rests against the circumferential surfaces 11 of the sleeves 5 and, in case of an impact, it moves the sleeves away mainly in the direction of the impact surface 16.

Figure 5:
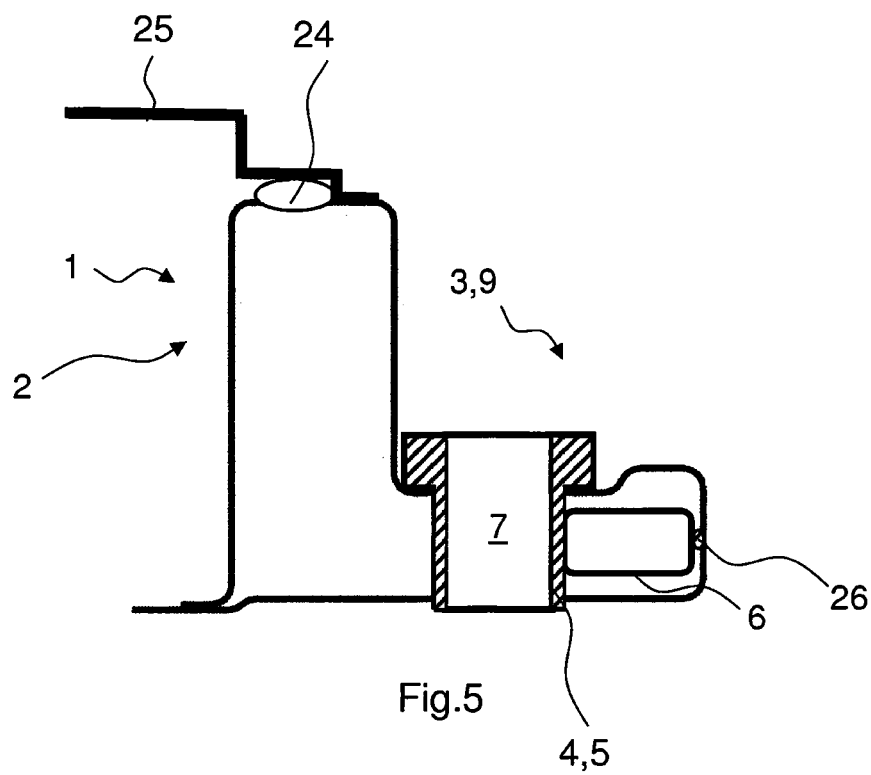
FIG. 5 a schematic sectional view of the structural component according to the invention, as shown in the second embodiment.

In this context, FIG. 5 shows a possible variant in which the reinforcement element 6 is configured as a box profile that is secured inside the profile segment 2 by means of a weld seam 26.

Figure 6:
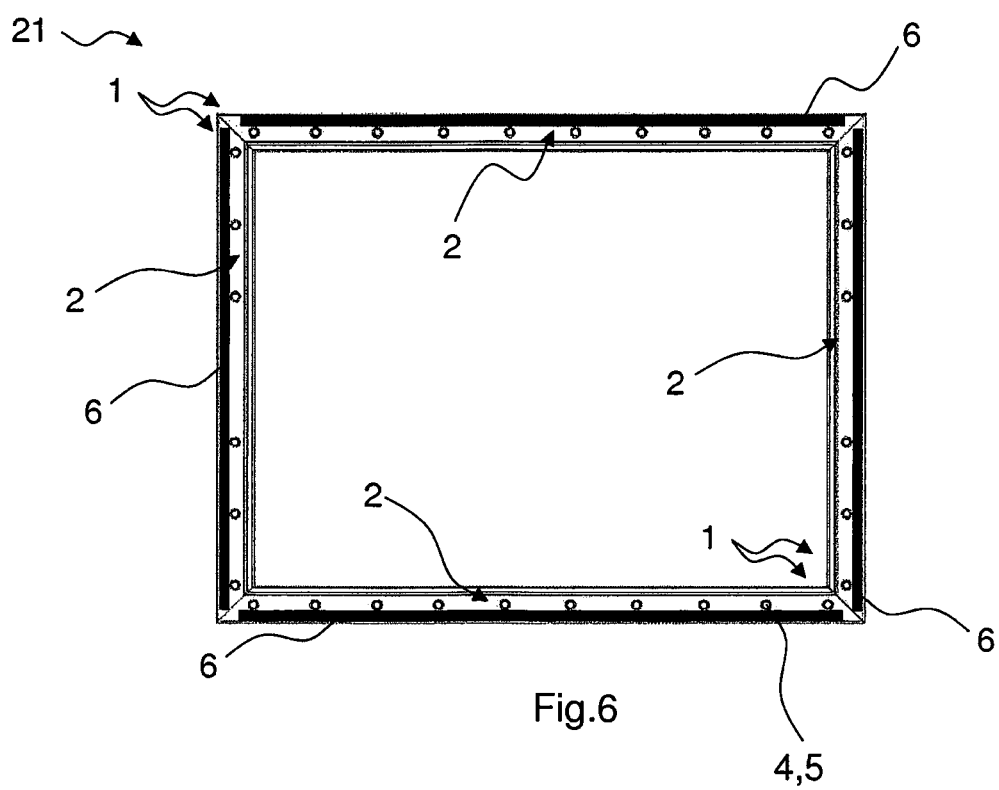
FIG. 6 a top view of a structural frame according to the invention.

FIG. 6 shows an installed structural frame 21 that has four structural components 1, each having a reinforcement element 6.

Figure 16:
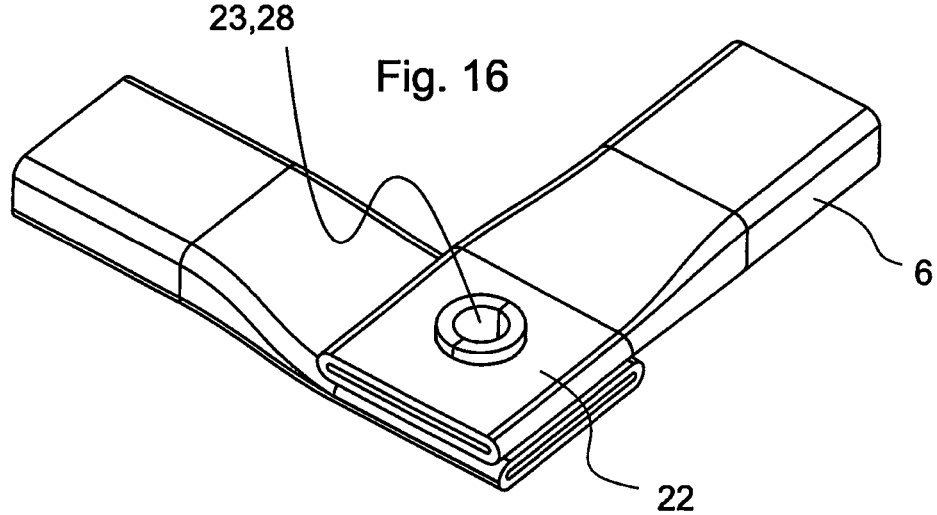
FIG. 16 a detailed view of a joining site at the end, according to the invention.
Figure 17:
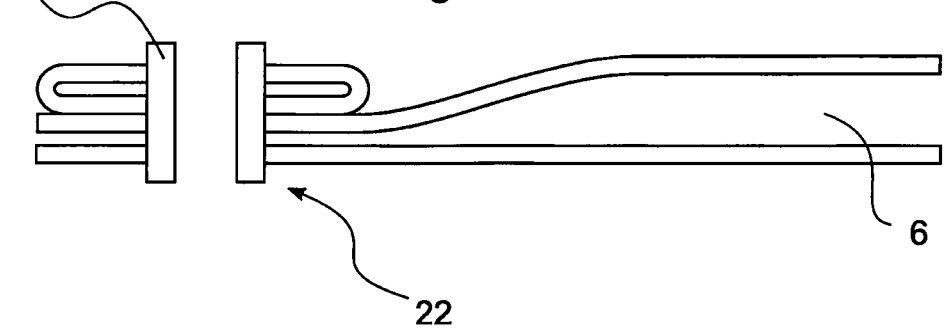
FIG. 17 a sectional depiction of a joined connection of the pipe ends.

A possible joining of the reinforcement elements 6 in the corner areas is depicted in FIGS. 16 and 17, in which the pipe ends 22 of the individual reinforcement elements 6 are visible. The pipe ends 22 are configured here so as to be embossed, so that they are flattened out relative to the rest of the reinforcement element 6. Moreover, here a hole is provided to accommodate a pin 28 that forms a connection means 23 to connect the pipe ends 22.

FIGS. 7, 8 and 12 to 15 depict additional variants of the invention. In the variant shown in FIG. 7, there is a box profile which is provided with several positive-fit means in the form of recesses 17 or indentations in which several sleeves 5 can be accommodated, at least partially.

Figure 7:
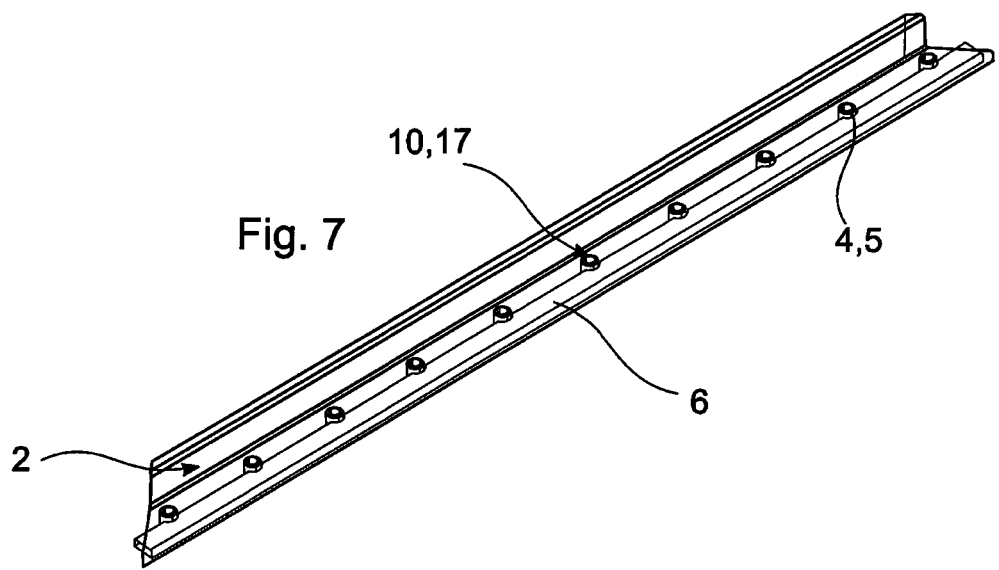
FIG. 7 a perspective view of part of a profile segment having the reinforcement element according to the invention as well as appertaining fastening means.
Figure 8:
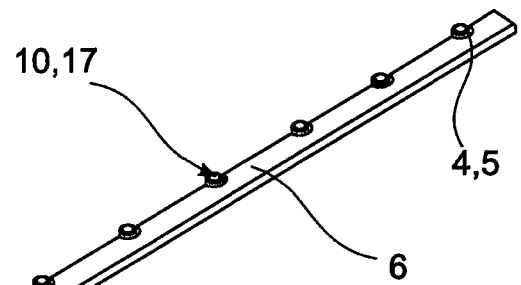
FIG. 8 a perspective view of a reinforcement element according to the invention, with fastening means according to the invention.

FIG. 8 shows a variant of the invention in which the reinforcement element 6 is configured as a C-profile, whereby the recesses 17 are more pronounced in comparison to those of FIG. 7 and they accommodate a larger circumference of the circumferential surface 11 of the sleeves 5. The recesses 17 or indentations can describe, for instance, up to a full semicircle.

Figure 9:
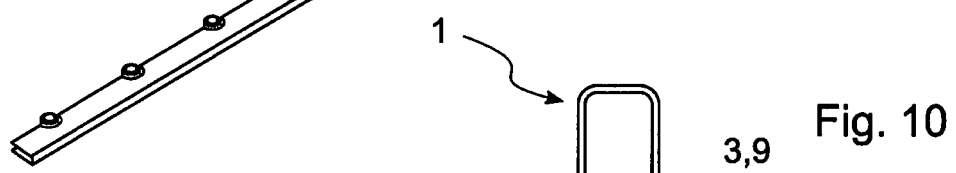
FIG. 9 a schematic side view of a third embodiment of the invention.

FIG. 9 shows a side view of the invention, whereby a box profile is used there as the reinforcement element 6. Here, in comparison to the variant shown in FIGS. 1 and 5, the sleeve 5 is inserted from the bottom 20 into the horizontal leg 9 of the profile segment 2.

Figure 10:
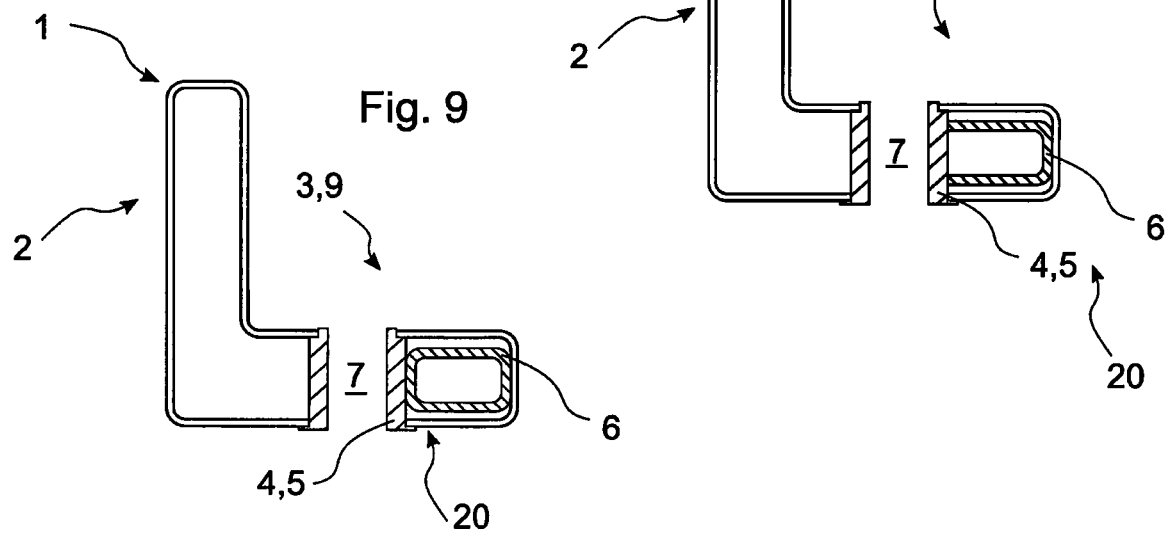
FIG. 10 a schematic side view of a fourth embodiment of according to the invention.

In comparison to this, in FIG. 10, instead of the box profile, a C-profile is provided for the reinforcement element 6.

In FIG. 11, instead of a conventional C-profile, a C-profile with a passage is employed for the production of the reinforcement element 6.

FIGS. 12 and 13 show detailed views of the embodiments according to FIGS. 7 and 8, in which the different design of the positive-fit means 10 can be seen very clearly.

Figure 14:
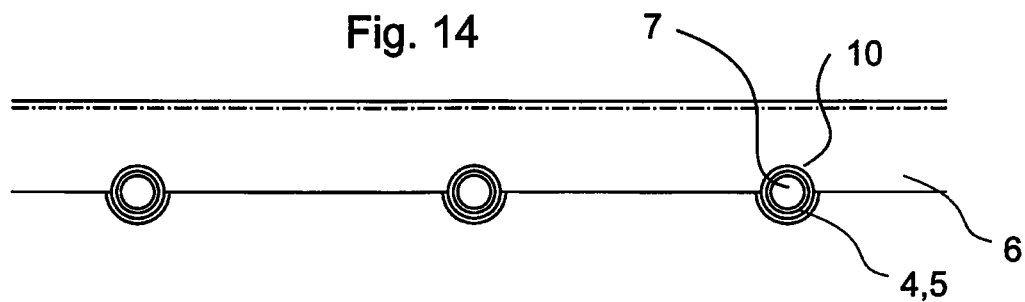
FIG. 14 a top view of a detailed view of the first embodiment.
Figure 15:
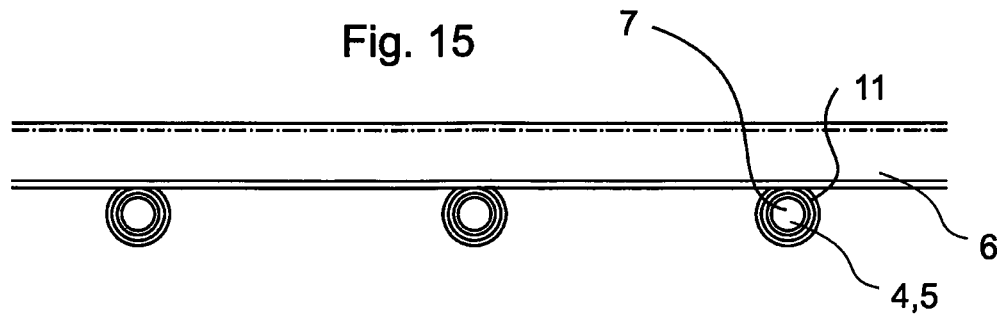
FIG. 15 a top view of a detailed view of the second embodiment.

FIG. 14 is a top view that corresponds to that of FIG. 13. FIG. 15 is a top view of an arrangement consisting of one reinforcement element 6 and three sleeves 5, whereby the reinforcement element 6 does not have any positive-fit means 10 and is merely resting against the side of the circumferential surfaces 11 of the sleeves 5.

It goes without saying that the individual features of the variants presented here are interchangeable and can be employed in other embodiments, so that properties of the invention presented here also yield sub-combinations that are encompassed by the scope of the invention.

The fundamental idea of the invention is that, in order to reinforce the structural profile, a reinforcement profile in the form of a reinforcement element 6 is provided which can act locally opposite from a thickening of the structural profile where an impact takes place. The reinforcement element can be provided in the lengthwise area as well as in the crosswise area of a structural frame 21 and it is made primarily of high-strength steel.

The function is essentially based on the fact that the reinforcement element 6 is supported on the surrounding sleeves 5 of the motor vehicle fastening means, as a result of which the local application of force stemming, for instance, from a post test piece is distributed over a larger surface area of the structural frame. In this context, the increase in the counterforce is based on the bending of the reinforcement element 6 when the reinforcement element is resting on the screw sleeves without being fastened and consequently a lengthwise compensation is possible. If the length of the reinforcement element 6 is increased and it comprises positive-fit means 10 in the area of the sleeves 5, then undercuts are created which, in the case of an intrusion by a post test piece, would block the movement of the reinforcement element 6, as a result of which the force absorption of the reinforcement element 6 under the same intrusion is increased due to the improved distribution of the force that has been introduced. In order to further increase the effect of the load distribution, the reinforcement elements at the frame corners are joined together in the above-mentioned manner so that a force occurring at the frame corners can be additionally absorbed by the frame part that is positioned approximately at a right angle thereto.

The structural frame 21 can be part of a battery box which is indicated in FIG. 5. The battery box here also has a cover 25 that rests on the structural frame 21 and that is sealed off by means of a gasket 24.

The present invention is not restricted in terms of its configuration to the embodiments presented here. Rather, several variants are conceivable which make use of the solution presented here, even in the case of other types of configurations. It will be appreciated by those skilled in the art that changes could be made to the embodiments described above without departing from the broad inventive concept thereof. It is understood, therefore, that this disclosure is not limited to the particular embodiments disclosed, but it is intended to cover modifications within the spirit and scope of the present disclosure as defined by the appended claims.

LIST OF REFERENCE NUMERALS 1 structural component
2 profile segment
3 fastening section
4 fastening means
5 sleeve
6 reinforcement element
7 hole
8 vertical leg
9 horizontal leg
10 positive-fit means
11 circumferential surface
12 additional profile
13 lower tab
14 upper tab
15 clamping area
16 impact surface
17 recesses
18 lengthwise direction
19 top
20 bottom
21 structural frame
22 pipe end
23 connection means
24 gasket
25 cover
26 weld seam
28 pin

The invention claimed is:

1. A structural component (1) for a motor vehicle, comprising:
an at least partially hollow profile segment (2) adapted for joining to a car body by at least two fastening means (4) arranged in a fastening section (3), the fastening section having a top (19) and a bottom (20), the fastening means (4) configured as sleeves (5) that extend between the top (19) and the bottom (20) of the fastening section, with each of the sleeves (5) defining a central axis and defining a hole (7) with a hole axis corresponding to the central axis and configured to receive a fastener, with the sleeves (5) held in the profile segment (2) with a substantially positive fit against lateral movement; and
a reinforcement element (6) extending in a lengthwise direction (18) of the profile segment (2) in the fastening section (3) between a side impact surface (16) and at least one of the fastening means (4), wherein, in the case of an impact coming from the impact surface (16), the reinforcement element (6) comes to rest against the side of at least one of the fastening means (4), thereby absorbing the impact energy, at least partially via a movement of the fastening means (4).

2. The structural component (1) according to claim 1, wherein the reinforcement element (6) in its installed state is secured in a clamping area (15) of the profile segment (2).

3. The structural component (1) according to claim 1, wherein the reinforcement element (6) has positive-fit means (10) that interact with the fastening means (4) so that, in case of an impact and engagement of the positive-fit means (10) into the fastening means (4), force is transmitted to the fastening means (4) in the lengthwise direction (18) of the profile segment (2).

4. The structural component (1) according to claim 3 wherein the positive-fit means (10) have recesses (17) in the reinforcement element (6) that match circumferential surfaces (11) of the sleeves (5).

5. The structural component (1) according to claim 1, wherein the reinforcement element (6) is configured as a hollow profile.

6. The structural component (1) according to claim 5, wherein the recesses (17) of the positive-fit means (10) are formed by indentations in the hollow profile.

7. The structural component (1) according to claim 1, wherein the reinforcement element (6) is created by a cold-rolled profile.

8. The structural component (1) according to claim 1, wherein the reinforcement element (6) is formed by a hydroformed profile.

9. The structural component (1) according claim 1, wherein the reinforcement element (6) is hardened by quenching.

10. The structural component (1) according to claim 1, wherein the fastener comprises a bolt or a screw.

11. A structural frame (21), comprising:
at least two structural components (1) joined at their ends, each structural component (1) comprising (a) an at least partially hollow profile segment (2) adapted for joining to a car body by at least two fastening means (4) arranged in a fastening section (3), the fastening section having a top (19) and a bottom (20), the fastening means (4) configured as sleeves (5) that extend between the top (19) and the bottom (20) of the fastening section, with the sleeves (5) held in the profile segment (2) with a substantially positive fit against lateral movement, and (b) a reinforcement element (6) extending in a lengthwise direction (18) of the profile segment (2) in the fastening section (3) between a side impact surface (16) and at least one of the fastening means (4), each reinforcement element (6) having embossed pipe ends (22), wherein, in the case of an impact coming from the impact surface (16), each reinforcement element (6) comes to rest against the side of at least one of the fastening means (4), thereby absorbing the impact energy, at least partially via a movement of the fastening means (4), wherein
the reinforcement elements (6) of the structural components (1) are joined to each other at their pipe ends (22) in order to transmit forces from one reinforcement element (6) to the other reinforcement element (6).

12. The structural frame (21) according to claim 11, wherein the reinforcement elements (6) are joined to each other to prevent a movement or rotation of the pipe ends (22) relative to each other.

13. The structural frame (21) according to claim 12, wherein the pipe ends (22) are either integrally bonded to each other or joined by at least one connection means (23).

14. A battery box for a motor vehicle having a structural frame (21) according to claim 12.

15. A battery box for a motor vehicle having a structural frame (21) according to claim 11.

16. A structural frame to protect a car component from crash impact, comprising:
at least two structural components joined at their ends, each structural component comprising (a) an at least partially hollow profile segment adapted for joining to a car body by at least two fasteners arranged in a fastening section, the fastening section having a top and a bottom, the fasteners configured as sleeves that extend between the top and the bottom of the fastening section, with the sleeves held in the profile segment, and (b) a reinforcement element extending in a lengthwise direction of the profile segment in the fastening section between a side impact surface and at least one of the fasteners, each reinforcement element having embossed pipe ends, wherein, in the case of an impact coming from the impact surface, each reinforcement element contacts the side of at least one of the fastening means, thereby absorbing the impact energy, at least partially via a movement of the fastening means,
wherein the reinforcement elements of the at least two structural components are joined to each other at their pipe ends in order to transmit forces from one reinforcement element to the other reinforcement element.

\* \* \* \* \*